United States Patent [19]

Nakanishi

[11] Patent Number: 5,150,136
[45] Date of Patent: Sep. 22, 1992

[54] STRUCTURE FOR CONNECTING EYEGLASS PARTS

[75] Inventor: Eiichi Nakanishi, Ashiya, Japan
[73] Assignee: Nakanishi Optical Co., Ltd., Osaka, Japan
[21] Appl. No.: 579,719
[22] Filed: Sep. 10, 1990
[30] Foreign Application Priority Data
  Apr. 3, 1990 [JP] Japan ................ 2-35913[U]
[51] Int. Cl.⁵ ............................................. G02C 5/14
[52] U.S. Cl. ........................... 351/111; 351/41; 351/124; 351/140
[58] Field of Search ............... 351/41, 111, 121, 153, 351/119, 124, 133, 134, 140

[56] References Cited
U.S. PATENT DOCUMENTS
  4,494,831 1/1985 Yaguchi ................ 351/41
FOREIGN PATENT DOCUMENTS
  4538582 3/1957 Canada ................ 351/121
  89717 7/1981 Japan ................ 351/41

Primary Examiner—Rodney B. Bovernick
Attorney, Agent, or Firm—Antonelli, Terry, Stout & Kraus

[57] ABSTRACT

Disclosed herein is a structure adapted to connect eyeglass parts to each other and comprising a small plate integrally extending from a main body of one eyeglass part which is made of a hardly solderable metal such as pure titanium or Ni-Ti base alloy. A connecting member made of an easily solderable metal has side walls and a cross section of U-shape defining a channel for receiving the small plate which has such constricted regions as formed at both sides surfaces of the small plate. The side walls of the connecting member are folded onto the inserted small plate such that inner surface material of said member are pressed into the constricted regions so as to be secured to said small plate. To the connecting member unseparably wound around the small plate, any other eyeglass part can be soldered or welded.

2 Claims, 2 Drawing Sheets

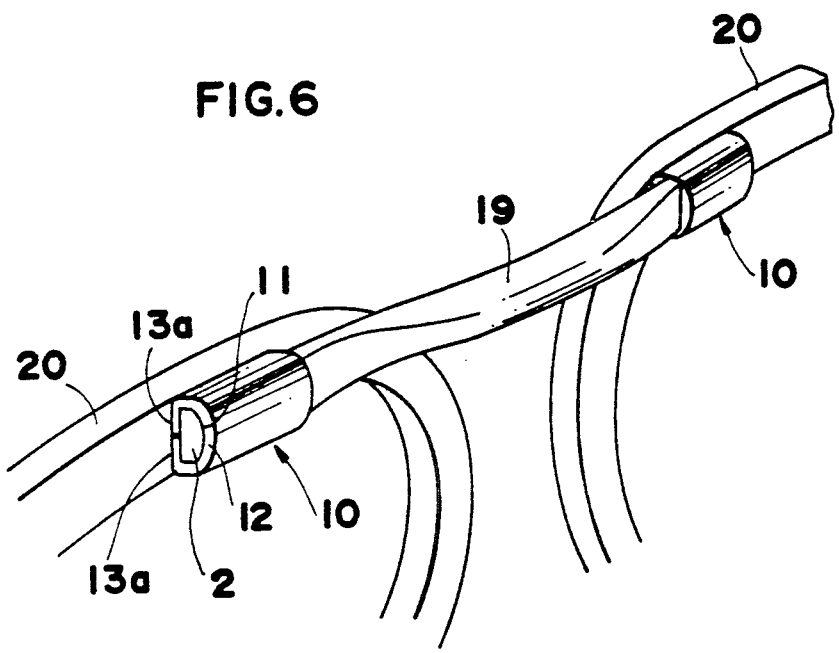
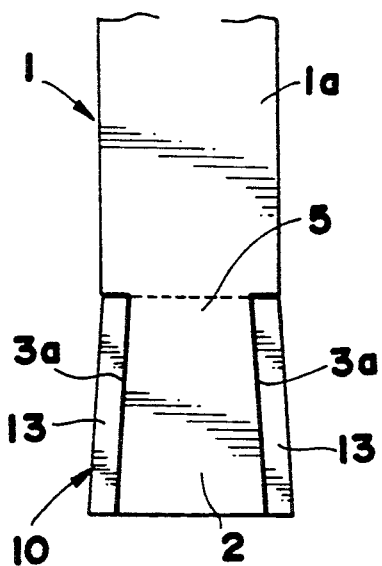
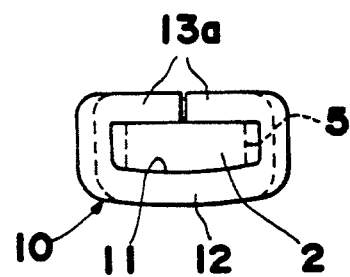

STRUCTURE FOR CONNECTING EYEGLASS PARTS

BACKGROUND OF THE INVENTION

1. Field of the Invention

The present invention relates to a structure for connecting eyeglass parts, in particular those eyeglass parts which constitute a metal eyeglass frame.

2. Description of Prior Art

There have been used stainless steels, nickel-chromium alloys, German silver, phosphor bronze or other metallic materials, as the parts constituting the metal frames of eyeglass. Recently, pure titanium or some nickel-titanium base alloys (i.e., Ni-Ti alloys) also have been made use of as said eyeglass parts because they are excellent in their properties such as mechanical strength, corrosion resistance, spring property or resilience and are lighter in their weight. In particular, Ni-Ti alloys are very useful in this field owing to their excellent characteristics including super elasticity which enhances to them the so-called "shape memory" property depending upon their compositions.

It is however difficult to solder the parts of pure titanium or the Ni-Ti alloys to each other or to other materials. Said metal or alloys should thus be coated with a nickel plating membrane or other plating before they are soldered to the other eyeglass parts made of German silver or other readily solderable materials, the plating membrane thereby being interposed for instance between Ni-Ti alloy phase and German silver phase.

Such interposition of the plating membrane between the surfaces of soldered materials brings about insufficient junction strength. It is also disadvantageous to add such plating step to the process for manufacturing the eyeglasses.

SUMMARY OF THE INVENTION

In order to resolve the problems inherent in prior art, the present invention aims to provide a structure for connecting eyeglass parts wherein a sufficient junction strength is obtained without necessitating any plating treatment.

According to the invention, a small plate is formed at a portion of a main body of an eyeglass part wherein the portion is to be connected to any other eyeglass part, the small plate extending from and being integral with the main body which is made of a hardly solderable metal such as pure titanium or Ni-Ti base alloy (i.e., nickel-titanium base alloy). Constricted regions are formed at both side surfaces of the small plate. On the other hand, a connecting member made of an easily solderable metal has side walls and a cross section of U-shape defining a channel into which the small plate is inserted. The side walls of the connecting member are folded onto the inserted small plate such that inner surface material of said member is pressed into the constricted regions of the small plate, whereby said connecting member is secured to said small plate. The other eyeglass part is thus soldered or welded to the connecting member unseparably wound around the small plate.

It will be apparent that though the eyeglass part is made of the hardly solderable metal such as pure titanium or Ni-Ti alloy said eyeglass part can be connected at its portion to the other eyeglass part, without failure, owing to the connecting member attached to said portion to be connected. Mechanical strength of such a junction between the eyeglass parts is so high that a strong and durable eyeglass assembly is manufactured, at a lower cost due to omission of the plating treatment.

BRIEF DESCRIPTION OF THE DRAWINGS

The invention will become more apparent from the description made hereinafter referring to the drawings, in which:

FIG. 6 is a perspective view showing said structure in another exemplified use;

FIGS. 7 and 8 are a plan view and a front elevation, respectively, which illustrate a process for assembling members involved in a structure for connecting eyeglass parts, in a further embodiment of the invention.

DETAILED DESCRIPTION OF PREFERRED EMBODIMENTS

Figure 1:
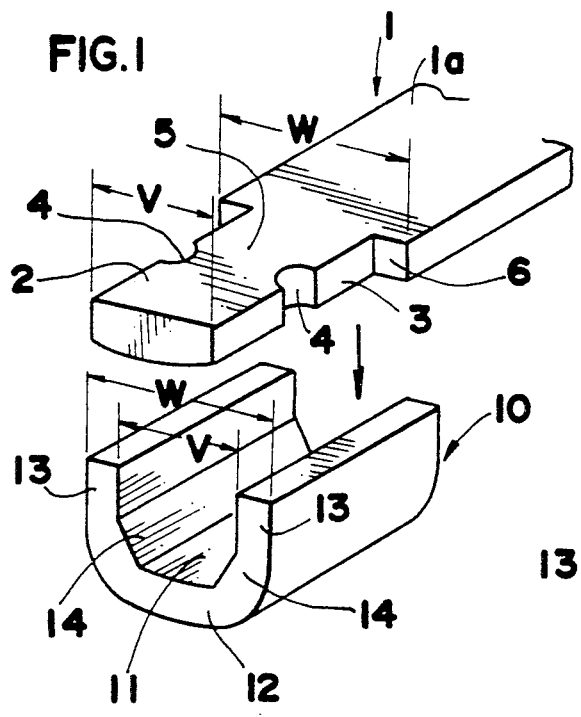
FIG. 1 is a perspective view showing members involved in a structure for connecting eyeglass parts in an embodiment of the invention.
Figure 2:
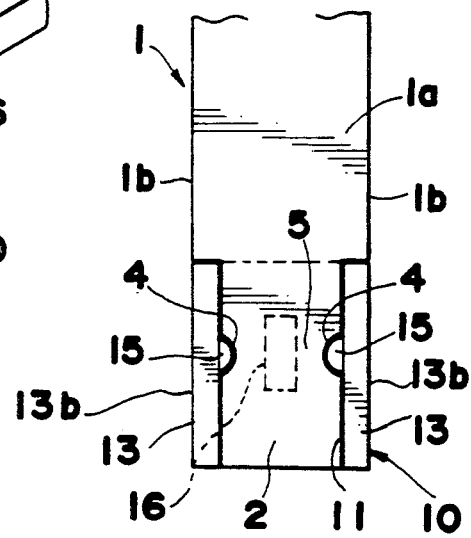
FIGS. 2 and 3 are a plan view and a front elevation, respectively, which illustrate a process for assembling the members in said structure.

FIGS. 1 to 5 illustrate an example in an embodiment of the invention wherein a temple or bow 1 as an eyeglass part is connected to another eyeglass part.

The temple 1 is an elongate and narrow plate made of a Ni-Ti alloy of super elasticity enhancing the so-called shape-memory property A small plate 2 is formed to extend from a main body 1a of the temple at its portion to be connected, a width "V" of the small plate being smaller than a width "W" of the main body 1a. Constricted regions 5 defined by cutouts 4 are formed at both side surfaces 3 of the small plate 2. Shoulders 6 are formed at boundaries between the main body 1a and the small plate 2.

The reference numeral 10 denotes a connecting member which is made of an easily solderable German silver and is of a U-shape defining a channel 11 into which the small plate is to be inserted Side walls 13 standing upwards from sides of a bottom 12 of the channel have outer surfaces which are spaced apart by a width equal to the width "W" of the main body 1a. A distance between inner surfaces of the side walls 13 is equal to the width "V" of the small plate 2. Inwardly tapered portions 14 are formed near and integral with the bottom 12, so as to continue from the inner surfaces.

In operation, the small plate 2 is inserted first into the channel 11 and then strongly pressed toward the bottom so that surface material of the tapered portions 14 are partially forced into the cutouts 4 so as to form engaging lugs 15. Those engaging lugs 15 prevent the connecting member 10 from being disengaged in an axial direction of the temple. A recess 16 as indicated by a broken line may be formed at a back surface of the small plate 2 in order that a surface material of the bottom 13 be compelled to fill the recess 16 to thereby provide an additional retaining force for the small plate.

Figure 3:
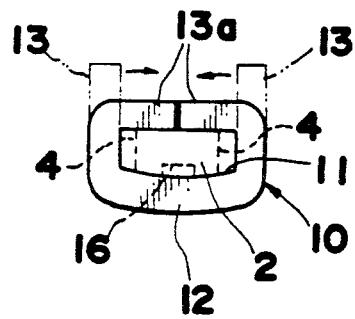

Next, the side walls 13 are bent inwards as shown in FIG. 3 so as to rest on an upper surface of the small plate 2, thereby causing the connecting member 10 to rigidly enclose said small plate 2. As a result, each side surface 1b of the main body 1a of the temple 1 becomes flush with each corresponding side surface 13b of the connecting member 10.

Figure 4:
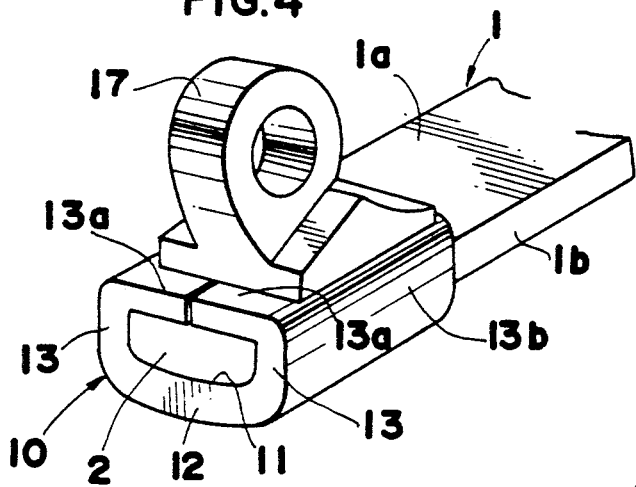
FIG. 4 is a perspective view illustrating a completed structure connecting said eyeglass parts.

A hinge member 17 is then soldered or welded, as shown in FIG. 4, to outer surfaces of the bent portion 13a of the side walls of said connecting member 10, which member has been attached to the temple 1 at the abovementioned portion to be connected.

Figure 5:
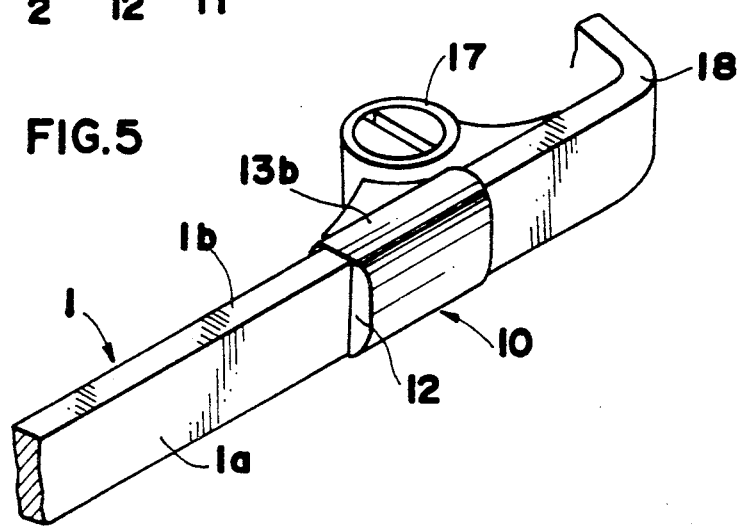
FIG. 5 also is a perspective view showing in part the completed structure in an exemplified use.

FIG. 5 shows the temple 1 which is subsequently connected by a hinge 17 to a lug 18 extending rearwards and is capable of pivotally moving relative thereto.

FIG. 6 shows another example of the embodiment applied to connection between a bridge 19 and a pair of rims 20. The bridge 19 is made of a metal of super elasticity, while the pair of rims 20 are made of German silver or the like.

FIGS. 7 and 8 illustrate another embodiment of the invention wherein a small plate 2 has both side surfaces formed as tapered surfaces 3a, a distance therebetween increasing towards a free extremity of the small plate. Such tapered surfaces 3a constitute a constricted region 5 in this case. Side surfaces of a connecting member 10 are also tapered corresponding to the tapered surfaces 3a so as not to be removed in axial direction.

What is claimed is:

1. A structure for connecting eyeglass parts, the structure comprising: a small plate formed at a portion of a main body of one of the eyeglass parts, the portion being connected to another of the eyeglass parts; the small plate extending from and being integral with the main body which is made of Ni-Ti base alloy; constricted regions formed at both side surfaces of the small plate; a connecting member made of another metal and having side walls and a cross section of U-shape defining a channel into which the small plate is inserted; the side walls of the connecting member being folded onto the small plate inserted in the channel in such a state that inner surface portions of said member are pressed into the constricted regions of the small plate, wherein said connecting member is secured to said small plate, thus allowing the other eyeglass part to be soldered or welded to the connecting member which is inseparably wound around the small plate, and wherein each side surface of the main body and each corresponding side surface of the connecting member are flush with each other.

2. A structure according to claim 1 wherein a recess is formed on a back surface of the small plate.

* * * * *